(12) United States Patent
Daum et al.

(10) Patent No.: US 8,224,510 B2
(45) Date of Patent: Jul. 17, 2012

(54) SYSTEM AND METHOD TO PROVIDE COMMUNICATION-BASED TRAIN CONTROL SYSTEM CAPABILITIES

(75) Inventors: Wolfgang Daum, Erie, PA (US); Jeffrey Baker, Overland Park, KS (US); Tom Otsubo, Oak Grove, MO (US); Gerald Douglas Rose, Erie, PA (US); Craig Stull, Grain Valley, MO (US); Gregory Hann, Grain Valley, MO (US); Phillip Danner, Mukilteo, WA (US)

(73) Assignee: General Electric Company, Schenectady, NY (US)

( * ) Notice: Subject to any disclaimer, the term of this patent is extended or adjusted under 35 U.S.C. 154(b) by 570 days.

(21) Appl. No.: 12/324,032

(22) Filed: Nov. 26, 2008

(65) Prior Publication Data

US 2010/0131129 A1    May 27, 2010

(51) Int. Cl.
*G05D 1/00* (2006.01)
(52) U.S. Cl. ...................................... 701/19; 246/167 R
(58) Field of Classification Search .................... 701/19, 701/20, 200, 201, 208, 209; 246/122 R, 246/167 R, 187 A, 187 B, 3; 340/901, 903, 340/388
See application file for complete search history.

(56) References Cited

U.S. PATENT DOCUMENTS

| | | | |
|---|---|---|---|
| 5,533,695 A | | 7/1996 | Heggestad et al. |
| 6,023,245 A | * | 2/2000 | Gomez et al. ................. 343/725 |
| 6,371,416 B1 | * | 4/2002 | Hawthorne .............. 246/122 R |
| 6,459,965 B1 | * | 10/2002 | Polivka et al. ................. 701/19 |
| 6,622,068 B2 | * | 9/2003 | Hawthorne ..................... 701/19 |
| 6,789,013 B2 | * | 9/2004 | Annett et al. ................. 701/213 |
| 7,151,997 B2 | * | 12/2006 | Uhlmann et al. ............. 701/208 |
| 7,222,003 B2 | * | 5/2007 | Stull et al. ....................... 701/19 |
| 2009/0037038 A1 | * | 2/2009 | Mollet et al. .................... 701/19 |

* cited by examiner

*Primary Examiner* — Mark Le
(74) *Attorney, Agent, or Firm* — GE Global Patent Operation; John A. Kramer

(57) ABSTRACT

A portable computer system and method of operating a vehicle using the portable computer system in a communication-based train control (CBTC) system territory is provided. The portable computer system includes a sensor and a transceiver that is communicatively coupled to the sensor and to the CBTC system, wherein the portable computer system configured to be removably coupled to the vehicle. The method includes verifying that the vehicle is operating with one of a non-operational CBTC computer system and a non-CBTC computer system, and removably coupling a portable computer system including at least one sensor and a transceiver that is communicatively coupled to the sensor to the vehicle such that the transceiver is coupled in communication with the CBTC system.

20 Claims, 4 Drawing Sheets

SYSTEM AND METHOD TO PROVIDE COMMUNICATION-BASED TRAIN CONTROL SYSTEM CAPABILITIES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to an improved system for controlling the movement of trains along a railroad track and, more particularly, to a portable on-board computer system for use with a communication-based train control (CBTC) system.

Some known rail systems use a CBTC system to promote safe and efficient transportation. When a train without a CBTC-compatible computer system enters a CBTC system territory, or when an on-board CBTC-compatible computer system within a CBTC system territory stops functioning, the CBTC system becomes "dark" and is no longer aware of every train within the rail system. Some known "dark" rail systems maintain their safety and integrity by requiring train crews to manually control their respective trains and to communicate via such means available to each train. However, a "dark" rail system is generally significantly less efficient than an operable CBTC system because it requires manual control of each train, which demands increased distances between trains, slower operating train speeds, and a reduced frequency of trains that move through a section of railroad. Therefore, there is a need to enable trains that do not include functioning on-board computer systems to communicate with a CBTC system as it travels through a CBTC system territory.

BRIEF SUMMARY OF THE INVENTION

In one aspect, a method of operating a vehicle in a communication-based train control (CBTC) system territory is provided. The method includes verifying that the vehicle is operating with one of a non-operational CBTC computer system and a non-CBTC computer system, and removably coupling a portable computer system including at least one sensor and a transceiver that is communicatively coupled to the sensor to the vehicle such that the transceiver is coupled in communication with the CBTC system.

In another aspect, a portable computer system for use with a vehicle operating in a CBTC system territory is provided. The portable computer system includes a sensor and a transceiver that is communicatively coupled to the sensor and to the CBTC, wherein the portable computer system configured to be removably coupled to the vehicle.

In another aspect, a CBTC is provided. The CBTC includes a vehicle and a portable computer system that includes a sensor and a transceiver that is communicatively coupled to the sensor and to the CBTC, wherein the portable computer system configured to be removably coupled to the vehicle.

DETAILED DESCRIPTION OF THE INVENTION

The system and methods described herein enable trains that do not include a communication-based train control (CBTC) system compatible on-board computer system, or that include a non-functioning CBTC-compatible on-board computer system, to communicate with a local CBTC system.

Figure 1:
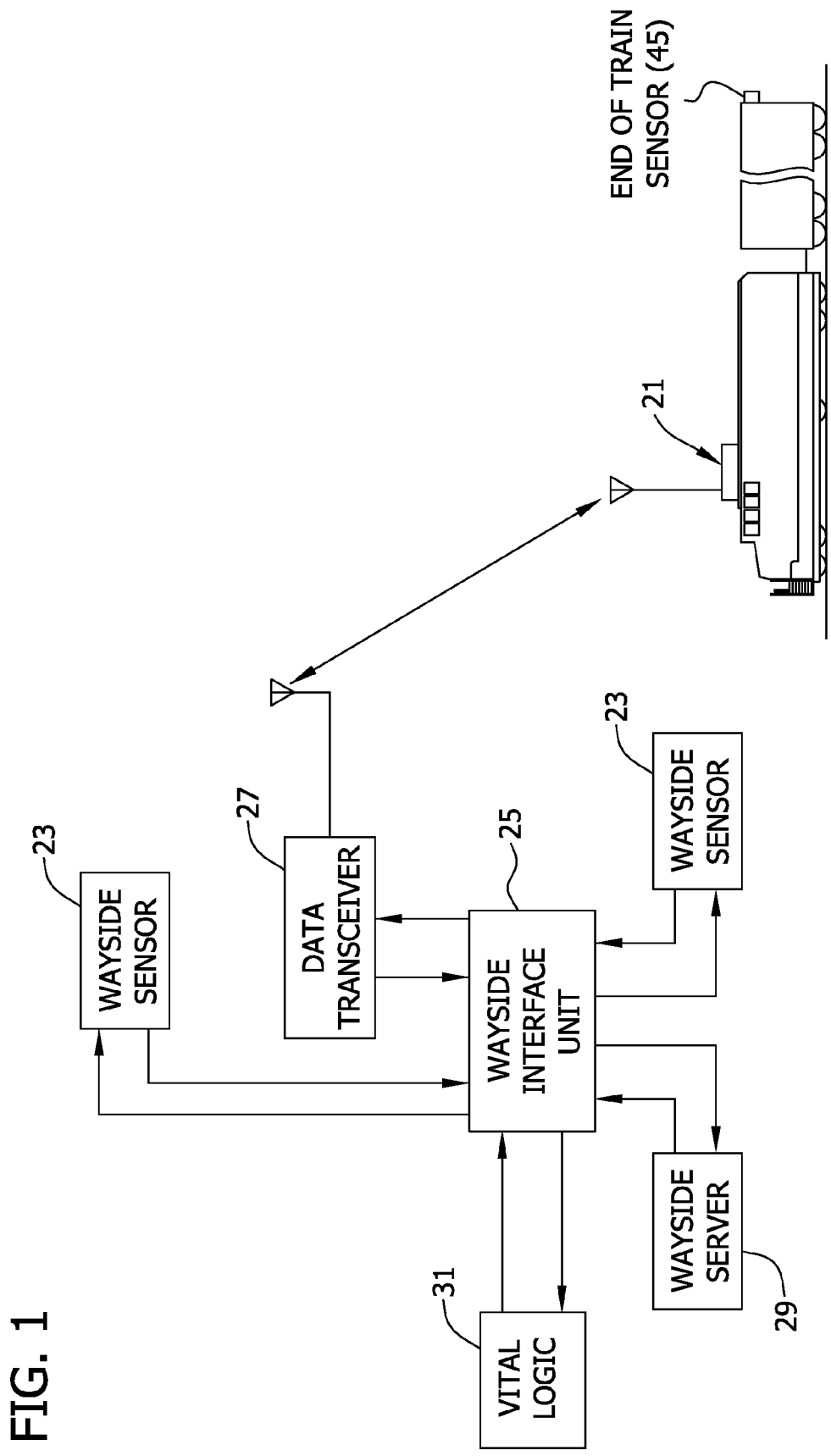
FIG. 1 is a block diagram of an exemplary communication-based train control (CBTC) system.

FIG. 1 is a block diagram of an exemplary CBTC system that includes a portable system 21, a plurality of wayside sensors 23 located at various places along a track (not shown) within a rail system (not shown), and a wayside interface unit 25. One example of a CBTC system is an incremental train control system. Portable system 21 can be used on any guided vehicle including, but not limited to, trains, monorails, trolleys, and/or guided buses. In the exemplary embodiment, wayside sensors 23 are spaced along the tracks at regular intervals, at interlockings, and at special detection sites. Wayside interface unit 25 includes a processor (not shown) and is communicatively coupled to portable system 21, wayside sensors 23, and a wayside server 29. Data transceivers 27 and 47 (shown in FIG. 2) communicatively couple portable system 21 to wayside interface unit 25 through any mode or medium of communication including, but not limited to, radio, wire lines, Internet, and/or cellular network.

During operation, wayside interface unit 25 collects data detected by wayside sensors 23 and by an end-of-train sensor 45. Wayside sensors 23 can detect occupied and unoccupied train tracks, and the alignment of railroad switches. Moreover, wayside sensors 23 can also detect train lengths, weights, speeds, accelerations, and train locations. In the exemplary embodiment, based on readings from end-of-train sensor 45, portable system 21 can determine from an end-of-train location whether a railcar has separated from the train, whether there is a difference in air pressure in the brake line, and whether equipment is dragging from the train. Vital logic 31 is programmed into wayside interface unit 25, thus enabling data to be processed and instructions to be executed. In the exemplary embodiment, portable system 21 includes a database that stores track information such as speed limits, locations of passing sidings, locations of other points where control action may be necessary, track conditions, terrain data, and distances. Wayside interface unit 25 uses vital logic 31 and detected data to calculate information such as distances between trains and various locations and/or distance and time required to stop each train. Wayside interface unit 25 also uses vital logic 31 to transmit appropriate movement orders such as slow, stop, and reverse orders. Wayside interface unit 25 also transmits and receives calculated information to and from portable system 21 and other wayside interface units (not shown) within a CBTC system territory via data transceivers 27.

Figure 2:
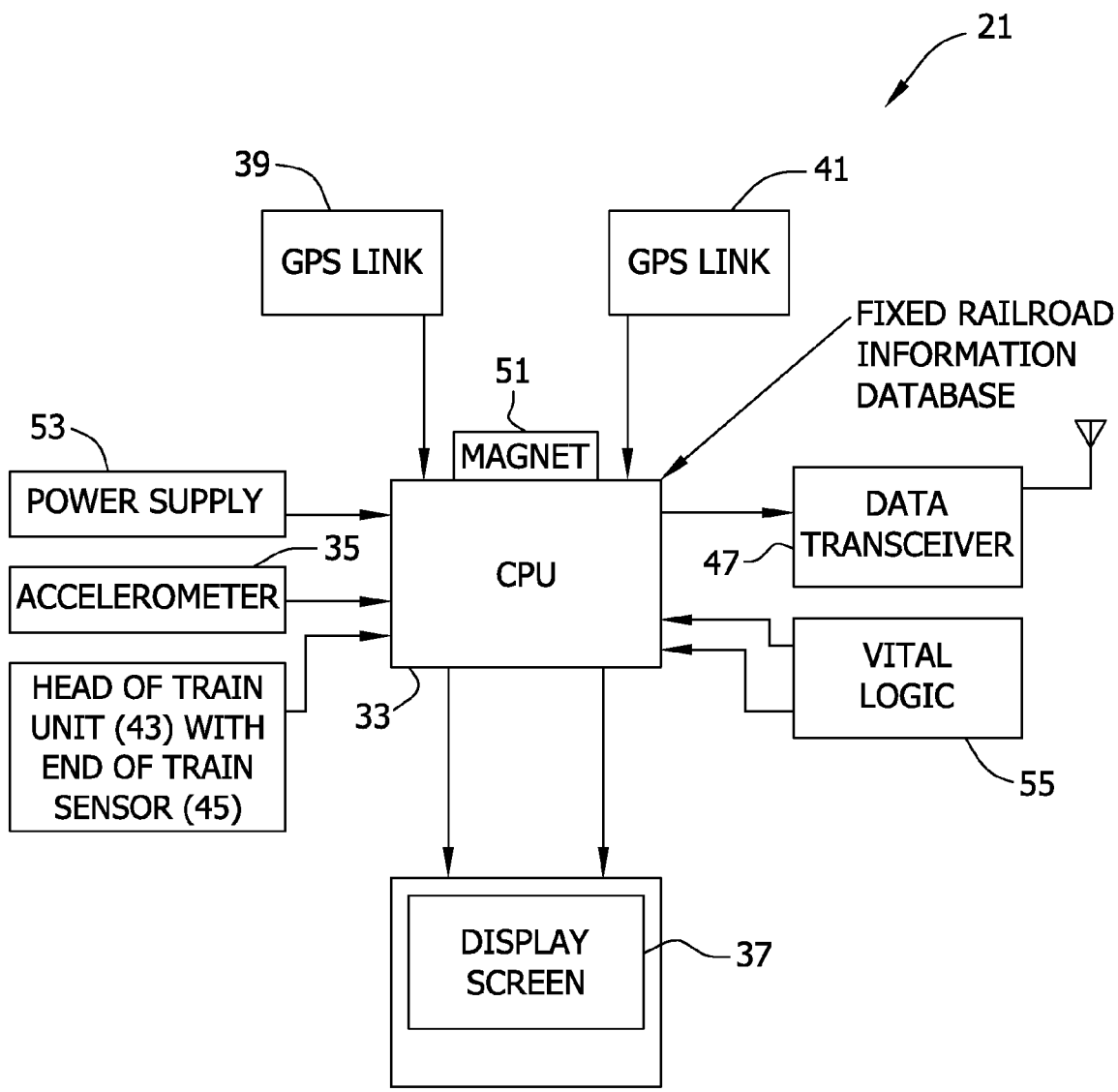
FIG. 2 is a block diagram of a portable on-board computer system for use with the CBTC system shown in FIG. 1.

FIG. 2 is a block diagram of an exemplary portable system 21 for use with the CBTC system (shown in FIG. 1). In addition to end-of-train sensor 45 (shown in FIG. 1), portable system 21 includes a central processing unit (CPU) 33, an accelerometer 35, a display screen 37, a plurality of global positioning system (GPS) links 39 and 41, a head of train unit 43, and a data transceiver 47. Portable system 21 is communicatively coupled with display screen 37, accelerometer 35, and end-of-train sensor 45 through head of train unit 43 via cables or wireless communications. In the exemplary embodiment, portable system 21 includes two global positioning links 39 and 41 to ensure correct positioning information.

In the exemplary embodiment, portable system 21 is generally compact and lightweight to enable it to be easily portable. Moreover, in the exemplary embodiment, display screen 37 is situated inside a train cab (not shown) that is proximate to the train crew, and the remainder of portable system 21 is positioned relative to the train cab (not shown) to facilitate transmitting and receiving signals to and from wayside interface unit 25. In the exemplary embodiment, portable system 21 includes a magnet 51 that facilitates removably coupling portable system 21 to the train cab. In alternative embodiments, portable system 21 may be removably coupled to the train using other coupling means, such as mechanical, electrical, and/or chemical coupling means.

In the exemplary embodiment, portable system 21 is powered via a battery 53. Battery 53 enables portable system 21 to be easily coupled to the train without cords or cables. In an alternative embodiment, portable 21 is powered via any other power source that enables portable system 21 to function as described herein.

During operation, as a train without an on-board computer system enters a CBTC system territory or as an on-board computer system within a CBTC system territory ceases functioning, portable system 21 is removably coupled to the train and activated. Portable system 21 then collects data detected by GPS links 39 and 41, accelerometer 35, and end-of-train sensor 45. In the exemplary embodiment, GPS links 39 and 41 can be used to determine train location, accelerometer 35 can be used to determine train speed and train acceleration, and end-of-train sensor 45 can be used to determine whether a railcar has separated from the train, whether there is a difference in air pressure in the brake line, and whether equipment is dragging from the train. Vital logic 55 is programmed into portable system 21, enabling data to be processed and instructions to be calculated. Portable system 21 includes a database that stores railroad track information such as speed limits, locations of passing sidings, locations of other points where control action may be necessary, track conditions, terrain data, and distances. Portable system 21 uses vital logic 55 and detected data to calculate information such as, for example, distances between trains and various locations and distance and time required to stop each train. Portable computer 21 also uses vital logic 55 to transmit appropriate movement orders such as slow, stop, and reverse orders. Portable system 21 transmits and receives calculated information to and from other computer systems (not shown) and wayside interface units 25 within a CBTC system territory via data transceiver 47.

Portable system 21 and wayside interface unit 25 continuously update their respective information and instructions to reflect changes and train movement. Moreover, portable system 21 cross-checks calculated information received from wayside interface unit 25 against information received from other on-board computer systems (not shown) and other wayside interface units (not shown). Where there is no conflict, portable system 21 displays the information and instructions on display screen 37. Where potential conflict exists, portable system 21 rechecks the dynamic data and recalculates instructions before displaying information and instructions on display screen 37.

In a first example, if a train is on a route without obstructions or other trains present, wayside interface unit 25 issues a movement order and a speed limit for a section of railroad. Alternatively, in another example, if a train is on a route with upcoming obstructions, wayside interface unit 25 issues a movement order and a speed limit for a section of railroad and a time and location at which the train needs to reduce its operating speed or stop. In a further example, if a train needs to back up to go a different direction at a railroad switch, wayside interface unit 25 transmits a movement order and a reverse speed limit for a section of railroad and a time and location at which the train needs to stop. In each example, data transceiver 47 receives the information and portable system 21 cross-checks the information received by transceiver 47 with information received from other on-board computer systems and other wayside interface units. In one embodiment, display screen 37 displays the information to enable a train crew to control the operation of the train based upon the displayed information. In an alternative embodiment, the train automatically navigates through the section of railroad based upon the received information.

As the train with portable system 21 exits the CBTC system territory, or if the permanent on-board computer system begins functioning normally again, portable system 21 is deactivated and decoupled from the train.

Figure 3A:
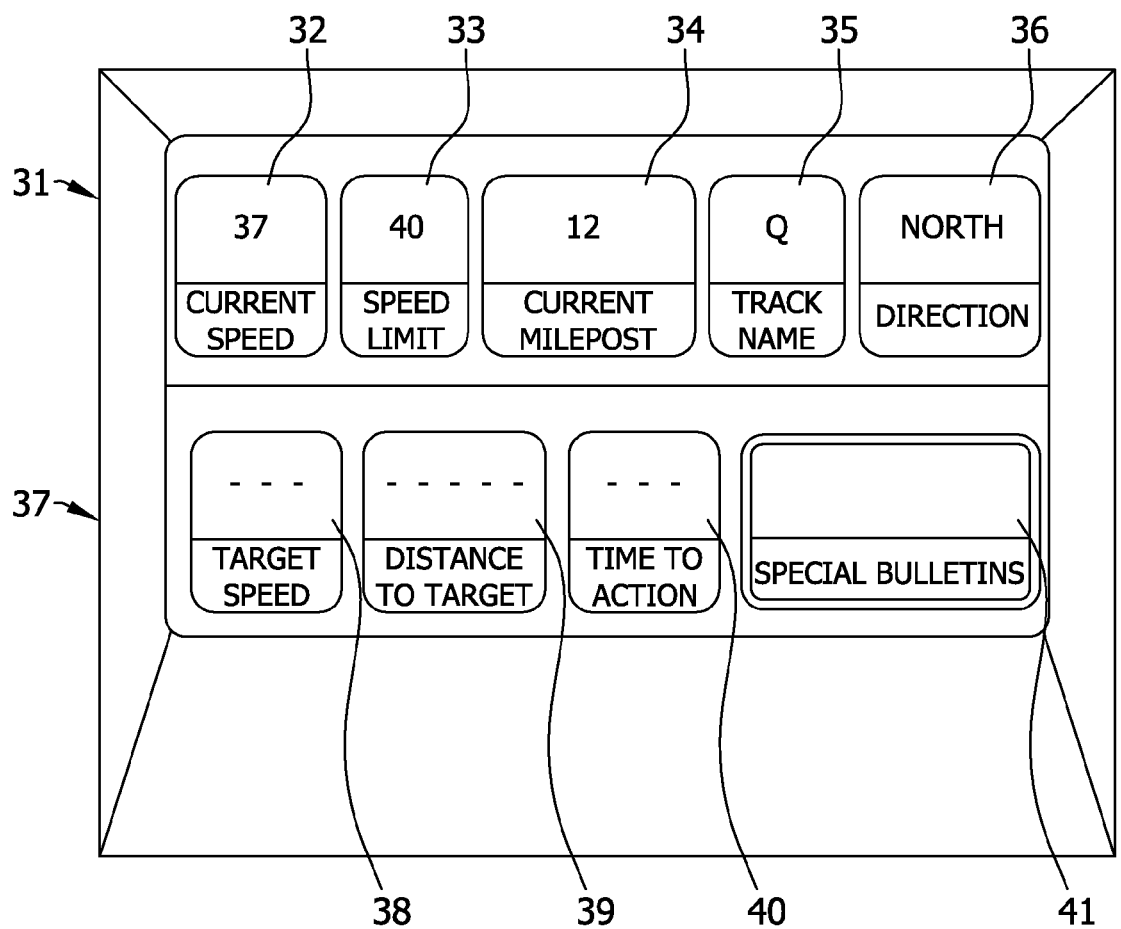
FIGS. 3a and 3b are exemplary screen shots of an operator display screen that may be displayed on the portable on-board computer system shown in FIG. 2.
Figure 3B:
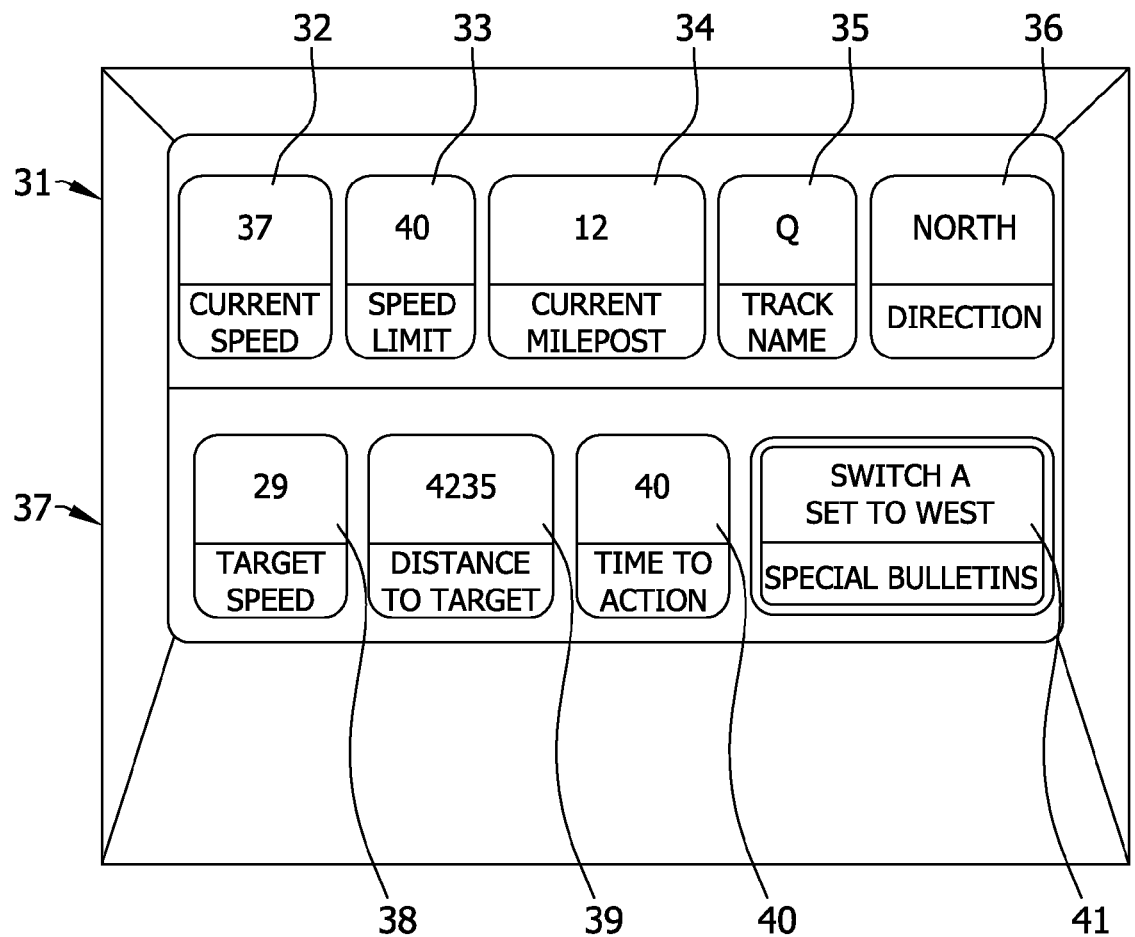

FIGS. 3a and 3b are exemplary screen shots displaying information that can be displayed on display screen 37 of portable system 21 (shown in FIG. 2). In the exemplary embodiment, in a top row 31, a current speed 32 of the train, a governing speed limit 33, a location 34 of the train as defined by the nearest milepost, a name 35 of the railroad track on which the train is traveling, and a direction 36 the train is traveling are each displayed. Moreover, in the exemplary embodiment, in a bottom row 37, a target speed 38 of the train, a distance 39 to the target, a time 40 required, and any special conditions 41 or messages are each displayed. In other embodiments, display screen 37 can include additional information and/or audible or visible alarms. In the exemplary embodiments, FIG. 3a illustrates an embodiment wherein no target exists and the train is clear to proceed, and FIG. 3b illustrates an embodiment wherein a target exists and the train will require further action.

The methods, apparatus, and systems described herein for a communication-based train control system are not limited to the specific embodiments described herein. The portable system described herein enables trains without permanent CBTC-compatible on-board computer systems, or those that have non-functioning CBTC on-board computer systems, to communicate with local CBTC systems and thereby be more precisely and automatically controlled. Practice of the methods, apparatus, or systems described or illustrated herein is not limited to only with an on-board computer system or a communication-based train control system. Rather, the methods, apparatus, and systems described or illustrated herein may be utilized independently and separately from other components and/or steps described herein.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in terms of various specific embodiments, those skilled in the art will recognize that the invention can be practiced with modification within the spirit and scope of the claims.

What is claimed is:

1. A method of operating a vehicle in a communication-based train control (CBTC) system territory, said method comprising:
   verifying that the vehicle is operating with one of a non-operational CBTC computer system and a non-CBTC computer system;
   removably coupling a portable computer system to the vehicle, the portable computer system temporarily functioning as an on-board computer system to communicate with at least one wayside interface unit as the vehicle travels through the CBTC system territory;
   communicatively coupling at least one sensor and a transceiver to the portable computer system,
   wherein the portable computer system impermanently communicates with the at least one wayside interface unit and controls the vehicle based on information received from the at least one wayside interface unit.

2. A method in accordance with claim 1 wherein removably coupling a portable computer system further comprises removably coupling the portable computer system to an exterior portion of the vehicle.

3. A method in accordance with claim 1 wherein removably coupling a portable computer system further comprises magnetically coupling the portable computer system to the vehicle.

4. A method in accordance with claim 1 wherein removably coupling a portable computer system further comprises removably coupling a display screen to an interior portion of the vehicle, the display screen configured to display information that facilitates controlling the vehicle.

5. A method in accordance with claim 1 wherein removably coupling a portable computer system further comprises removably coupling an accelerometer to an exterior portion of the vehicle.

6. A method in accordance with claim 1 wherein removably coupling a portable computer system further comprises removably coupling a positioning system to an exterior portion of the vehicle.

7. A system for use with a vehicle operating in a communication-based train control (CBTC) system territory, said system comprising:
   a portable computer system comprising:
      a central processing unit; and
      at least one global positioning link coupled to the central processing unit to receive positioning information of the vehicle in the CBTC system territory;
   at least one sensor coupled to the portable computer system; and
   a transceiver that is communicatively coupled to said at least one sensor and to said portable computer system, said portable computer system configured to be removably coupled to the vehicle such that when the portable computer system is coupled to the vehicle, said portable computer system is configured to temporarily function as an on-board computer system to communicate with a wayside interface unit when the vehicle enters and travels through the CBTC system territory, the portable computer system further configured to impermanently communicate with the wayside interface unit and control the vehicle based on information received from the wayside interface unit.

8. A system in accordance with claim 7, wherein said portable computer system is configured to be removably coupled to an exterior portion of said vehicle.

9. A system in accordance with claim 7 further comprising a magnet that is configured to removably couple said portable computer system to an exterior portion of said vehicle.

10. A system in accordance with claim 7 further comprising a display screen that is removably coupled to an interior portion of said vehicle, said display screen configured to display information that facilitates controlling the vehicle.

11. A system in accordance with claim 7 further comprising an accelerometer that is removably coupled to an exterior portion of said vehicle.

12. A system in accordance with claim 7 further comprising a positioning system that is removably coupled to an exterior portion of said vehicle.

13. A system in accordance with claim 7, wherein said at least one sensor is configured to determine at least one of whether a railcar has separated from said vehicle, an air pressure in a brake line, and whether equipment is dragging from said vehicle.

14. A system comprising:
   a vehicle;
   a portable computer system comprising:
      a central processing unit; and
      a plurality of global positioning links coupled to the central processing unit to receive positioning information of the vehicle in a communication-based train control (CBTC) system territory;
   at least one sensor coupled to the portable computer system; and
   a transceiver that is communicatively coupled to said at least one sensor and to the portable computer system, said portable computer system configured to be removably coupled to the vehicle such that when the portable computer system is coupled to the vehicle, said portable computer system is configured to temporarily function as an on-board computer system to communicate with a wayside interface unit when the vehicle enters and travels through the CBTC system territory, the portable computer system further configured to impermanently communicate with the wayside interface unit and control the vehicle based on information received from the wayside interface unit.

15. A system in accordance with claim 14, wherein said portable computer system is configured to be removably coupled to an exterior portion of said vehicle.

16. A system in accordance claim 14 further comprising a magnet that is configured to removably couple said portable computer system to an exterior portion of said vehicle.

17. A system in accordance with claim 14 further comprising a display screen that is removably coupled to an interior portion of said vehicle, said display screen configured to display information that facilitates controlling the vehicle.

18. A system in accordance with claim 14 further comprising an accelerometer that is removably coupled to an exterior portion of said vehicle.

19. A system in accordance with claim 14 further comprising a positioning system that is removably coupled to an exterior portion of said vehicle.

20. A system in accordance with claim 14, wherein said at least one sensor is configured to determine at least one of whether a railcar has separated from said vehicle, an air pressure in a brake line, or whether equipment is dragging from said vehicle.

* * * * *